Dec. 22, 1953 — F. E. TUTTLE ET AL — 2,663,215
METHOD AND APPARATUS FOR DETERMINING THE VELOCITY AND ACCELERATION CHARACTERISTICS OF MOVING OBJECTS
Filed April 27, 1950 — 2 Sheets-Sheet 1
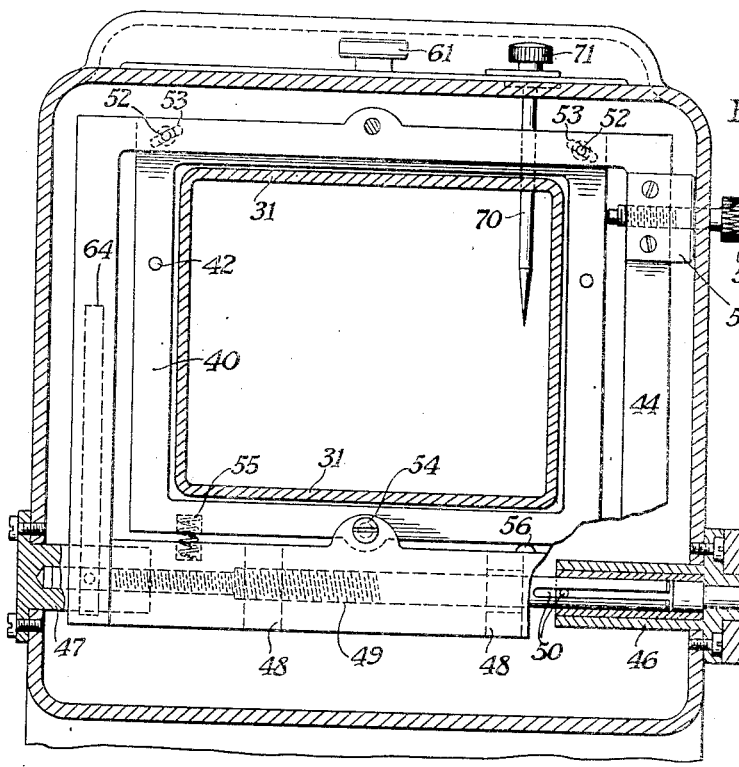
FIG. 7.
FIG. 8.
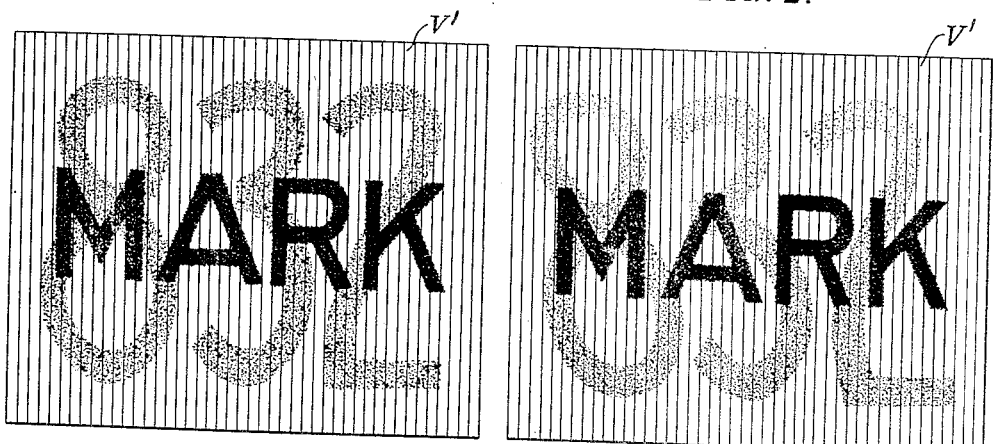
FIG. 1.
FIG. 2.
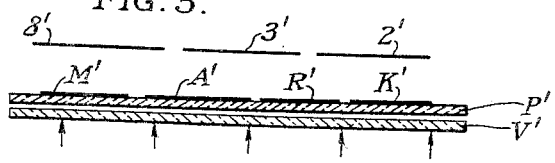
FIG. 5.
FORDYCE E. TUTTLE
WALTER C. NEWCOMB
Daniel J. Mayne
INVENTORS
BY
ATTORNEYS Dec. 22, 1953 F. E. TUTTLE ET AL 2,663,215
METHOD AND APPARATUS FOR DETERMINING THE VELOCITY AND
ACCELERATION CHARACTERISTICS OF MOVING OBJECTS
Filed April 27, 1950 2 Sheets-Sheet 2
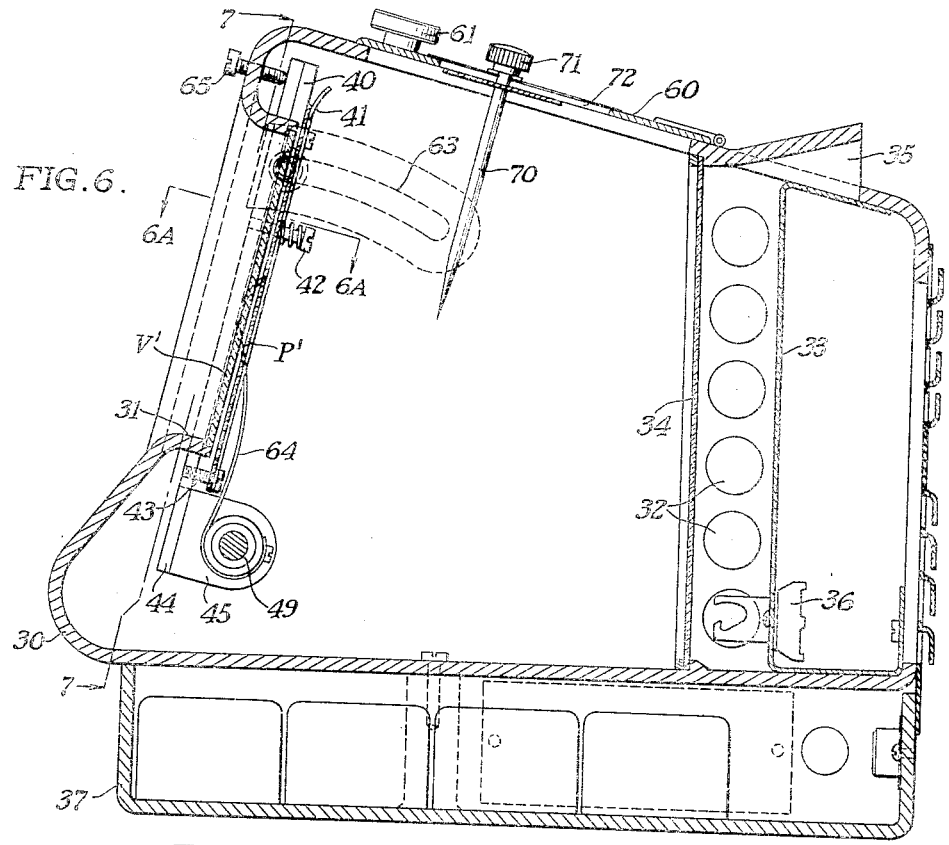
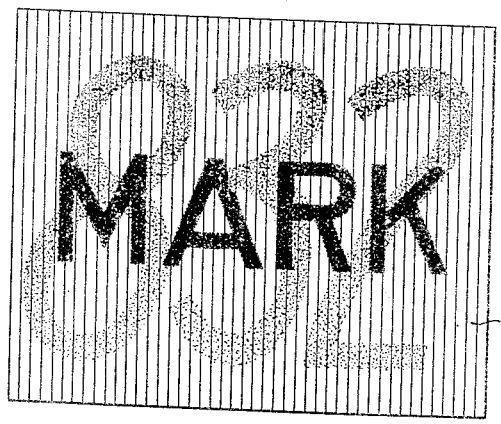
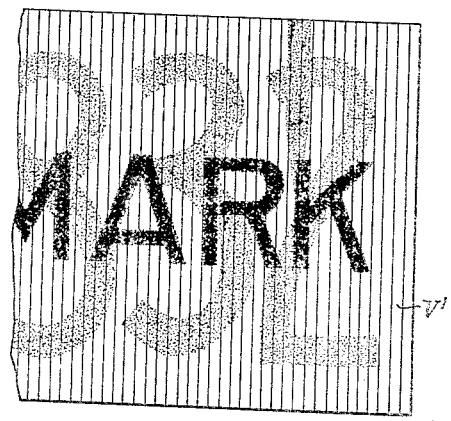
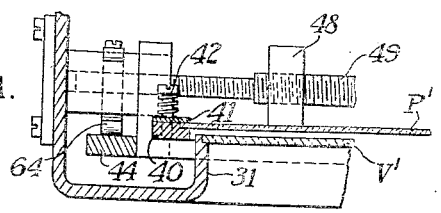
FORDYCE E. TUTTLE
WALTER C. NEWCOMB
INVENTORS Patented Dec. 22, 1953

2,663,215

UNITED STATES PATENT OFFICE 2,663,215

METHOD AND APPARATUS FOR DETERMINING THE VELOCITY AND ACCELERATION CHARACTERISTICS OF MOVING OBJECTS

Fordyce E. Tuttle and Walter C. Newcomb, Rochester, N. Y., assignors to Eastman Kodak Company, Rochester, N. Y., a corporation of New Jersey Application April 27, 1950, Serial No. 158,620

7 Claims. (Cl. 88—14)

The present invention relates to a method and apparatus for photographically determining the velocity and acceleration characteristics of moving objects, and particularly high-speed objects.

This invention is a modification of the method of photographically determining the velocity and acceleration characteristics of moving objects set forth and claimed in our copending patent application Serial No. 158,619, filed on even date herewith. According to the method of our noted copending application, a time displacement curve of the moving object is obtained by photographing the object through a lined screen moving with uniform velocity and viewing the photographic record through an identical lined screen which is tilted relative to the linear images of the photographic record. Then, by observing how a reference line on the object, which is normally vertical, appears through this tilted screen, the velocity and acceleration characteristics of the object can be determined. For instance, if the reference line appears to lean, but is straight, then the object was moving at uniform velocity, whereas if the line appears curved, then it indicates the object was accelerating and the direction of curvature will tell whether the acceleration was positive or negative.

One object of the present invention is to provide a method of determining the velocity and acceleration characteristics of an object having a rectilinear motion.

A further object is to provide a method of determining the velocity and acceleration characteristics of a moving object which involves photographically recording the time displacement characteristics of the object and viewing the photographic record in such a way that the relative displacements of the object during successive intervals of time can be simultaneously observed and will appear stereoscopically different, depending upon its velocity and its acceleration characteristics.

And, another object is to provide a method of determining the velocity and acceleration characteristics of an object moving rectilinearly at high speed which involves photographically recording the object through a lined screen and viewing the photographic record through a like lined screen and making use of the motion stereoscopic effect which is an inherent feature of this method of taking and viewing pictures in order to determine the velocity or acceleration characteristics of the object.

And, another object is to provide an apparatus by which photographic records of the type set forth may be viewed and by the use of which the velocity and acceleration characteristics of the photographed object can be measured.

The novel features that we consider characteristic of our invention are set forth with particularity in the appended claims. The invention itself, however, both as to its organization and the steps and results involved therein, together with additional objects and advantages thereof, will best be understood from the following description when read in connection with the accompanying drawings, in which Figs. 1–4 diagrammatically illustrate how pictures taken of moving objects and viewed according to the present invention might appear. Fig. 1 shows how the moving object would appear if it had a uniform velocity and was viewed with the linear images of the picture and the lines of the viewing screen parallel to each other. Fig. 2 shows how the moving object would appear if it had positive acceleration, while Fig. 3 shows how it would appear if it had negative acceleration. Fig. 4 shows how the pointer of the viewing apparatus is used to measure the velocity and/or acceleration of the object.

Fig. 5 is a diagrammatic view showing the photographic record, viewing screen and apparent images seen in Fig. 1 and illustrating that the apparent images of the two objects seen in Fig. 1 have different apparent stereoscopic positions;

Fig. 6 is a vertical sectional view taken from the front to the rear of a viewing apparatus constructed in accordance with a preferred embodiment of the present invention;

Fig. 6-A is a partial sectional view taken substantially on lines 6—A of Fig. 6;

Fig. 7 is a vertical sectional view of the viewing apparatus shown in Fig. 6 and taken substantially on line 7—7 of Fig. 6; and Fig. 8 is an elevational detail plan view showing the scale and index combination atop the viewing apparatus which gives the measurements of velocity and/or acceleration of the moving objects being viewed.

Like reference characters refer to corresponding parts throughout the drawings.

Throughout the specification and claims the word "stereo" is used as a short form of "stereoscopic" and/or relates to steroscopy, while "in stereo" means "stereoscopically."

In our noted copending patent application we have disclosed a method of determining the velocity and acceleration characteristics of a moving object which makes use of the application of the multiple line screen principle to high-speed photography, as disclosed in copending U. S. patent application Serial No. 114,352, filed September 7, 1949, now Patent No. 2,578,327, issued December 11, 1951. According to the multiple lined screen principle of high-speed photography, if a moving object is photographed through a lined screen which is translated to new positions with a uniform and rapid velocity, a high-speed sequence of motion pictures may be recorded on a sensitized surface; each picture of the sequence being a composite picture made up of a plurality of linear images or elements of the complete picture which, when viewed simultaneously through a lined screen, like that through which they were exposed, will appear as one positional image of the moving object. The actual number of composite pictures that can be made will be limited by the ratio of the width of the transparent and opaque lines of the screen, since a new picture will be taken each time the screen is moved a distance equal to the width of its transparent lines.

In our noted copending application relating to a method of determining the velocity and acceleration characteristics of a moving object, the viewing screen is tilted relative to the photographic record and a vertical reference line on the object is observed to see if it appears inclined or vertical, and if it does appear inclined, then to see if it is straight or curved, and, if curved, in what direction. This method depends upon the object having a vertical reference line which, in effect, appears as a displacement time curve of the moving object, and since all objects do not contain vertical reference lines, or are not susceptible to suitable targets being placed thereon, this method is not universally applicable.

While the present invention makes use of the multiple lined screen principle to high-speed photography, the velocity and acceleration characteristics of the object are observed in this instance by making use of the motion stereo which is an inherent feature of this method of taking pictures, and is not limited to the object being photographed having a vertical reference line which produces a displacement time curve of the object. In fact, both the first and second derivatives of motion can be observed from the same photographic plate by making use of this motion stereo feature.

When the exposing lined screen is in contact with (or very close to) the photographic plate and is moved across the plate, a series of successive "frames" of the moving object are exposed on the plate, each "frame" representing a given position of the object in space. If now, this photographic record is placed in a viewer in which the lined screen is separated by a small distance from the emulsion surface, a stereo image of the object photographed will be seen. This is true since the separation of the screen and photographic record in the viewer allows one eye to see past the congruent edges of several slits to see one time "frame" while the other eye sees past the other congruent edges of the same slits to look at another time "frame." Since the object was moving when photographed, these images seen by opposite eyes are separated physically on the plate and the altered angle of convergence is interpreted as stereo. The magnitude of the stereo effect is directly related to the plate and grid separation in the viewer, as well as to the object velocity, since these factors control the relative "time spaced frames" each eye can see.

The wider the separation, the greater the magnitude of the stereo effect, which would not be apparent at all if the photographic record and screen in the viewer were in contact as is the usual practice, and particularly in the method of determining the velocity and acceleration characteristics of a moving object in accordance with the invention disclosed in our above-noted copending appliaction. The fact that the taking screen and photographic plate are not exactly in contact during exposure contributes in a small way to the magnitude of the stereo effect, since with separation a given distance in object space may be recorded as distorted distances, depending upon the angle of view of the particular point in question in the image space.

These stereo images show a lean (sideways) when viewed through a tilted viewing screen in exactly the same manner as mentioned in our copending application. This lean is a direct plot of the first derivative of motion of the object assuming that the taking screen, as well as the object, was moving with a uniform velocity at the time of exposure.

If now, however, the object was moving with a positive or negative acceleration, the stereo images make the second derivative of motion (acceleration) immediately apparent. Since the observed stereo effect in this case is almost entirely that due to motion of the object, the magnitude of the apparent depth of the stereo effect is a direct function of the velocity of the object over the time span the two observed "frames" were taken. That is, for a given position of the observer, his interocular distance, the physical dimensions of the viewing screen, and its separation from the photographic record, allow him to see two "frames" separated by a time interval which is constant for that set of conditions. The separation of the images attained in that interval due to the object velocity determines the amount of apparent depth received. If now, the photographic record is observed through a lined screen which is tilted, one places this fixed "stereo time separation" in continuously varying positions which are contiguous over an extended time interval. The position of this "time separation" in the time interval varies from the bottom to the top of the record. In other words, with the tilted viewing screen, as one looks from the bottom of the record to the top, he is looking at successive pairs of "sterero frames" separated by a constant time separation, assuming that the pivot of rotation of the viewing screen, relative to the photographic record, is somewhere below the record.

Now let us assume that the object photographed is moving with a non-uniform velocity, for example, being accelerated. This means that the image separation within each pair of "constant time separation stereo frames," and, therefore, the apparent depth of the image in that pair when observed in the viewer, wall vary. This corresponds to a weaker angle of convergence and an interpretation as increased depth. Thus, the stereo image, when viewed through a tilted screen, and non-uniform motion is present in the object, appears to lean not only sideways (first derivative), but also appears to tilt backward or forward, depending upon whether the object is accelerating or decelerating, respectively.

The first step in carrying out our method is to photograph the moving object, of which the velocity and acceleration characteristics are desired, onto a photographic plate, or other type of sensitized surface, through a lined screen which is moved across and substantially in contact with the plane of the photographic plate at a constant or uniform velocity. This screen should have its parallel transparent lines equally separated by a distance which is a multiple of the individual width of its transparent lines so that a plurality of composite pictures can be exposed on the plate as the screen moves a distance equal to that between two adjacent transparent lines. Ordinarily, the camera will be so oriented that the screen will move in a plane substantially parallel to that of the object and with the lines of the screen disposed substantially at right angles to the direction of movement of the object. Any suitable grid-type, high-speed camera can be used to make this exposure, for example, one like that disclosed in copending patent application Serial No. 114,352, filed September 7, 1949, so long as the screen is capable of being moved with a uniform velocity which is sufficiently great relative to that of the object being photographed so as to effectively stop the motion of the object at successive positions in its travel, as will be depicted by successive composite pictures recorded on the photographic plate.

This exposed photographic plate when processed to bring out the latent images will produce a photographic record comprising a plurality of composite pictures in adjacent relationship, each of which consists of a plurality of spaced linear image elements corresponding in dimension and shape to the lines of the exposing screen. Each composite picture will depict a single position of the object differing from adjacent composite pictures by a given time interval determined by the velocity at which the screen was moved during the exposure. Each composite picture on the plate will be the equivalent of adjacent individual frames in a conventional motion picture film to the extent that it depicts separate positions of the object at different time intervals. Accordingly, each of the composite pictures can be accurately referred to as a "frame" of the motion series and throughout the remainder of the specification and claims the composite pictures and/or the linear image elements, of which the same are composed, will be so referred to. Inasmuch as each composite picture or "frame" depicts separate positions of the object and different time intervals they can be referred to as "time frames."

The number of different composite pictures which can be exposed on a given photographic plate before double exposure begins will be determined in most instances by the ratio between the width of the lines of the taking screen and the space between each line. In order to have a concrete example to talk about, let us assume that the lined screen has the relative dimensions set forth in the above-noted copending application Serial No. 114,352. In this instance, the transparent lines of the screen are each .001" wide and spaced from one another on .030" centers so that 30 different composite pictures may be recorded on the photographic plate when the screen is moved a distance of .030". Each of these composite pictures will be made up of a plurality of .001" wide linear images spaced .030" apart on the plate and every thirtieth linear image on the plate will be a part of equivalent time "frames" since they were exposed at the same instant. Each of the other 29 "frames" or the image elements making up the same between any two equivalent time "frames," and forming one element of the other 29 composite pictures, will represent "frames" separated from the adjacent "frame" by a known time interval dependent upon the velocity of the screen. If, for example, the screen or grid is moving at a uniform velocity of one inch per second, it will take $1/1000$ of a second for the screen to move the width of one transparent line and the composite pictures or "frames" will be separated by time increments of $1/1000$ second.

Now if the photographic record is viewed through a lined screen like that through which it was exposed, but the viewing screen is separated from the images on the record by a small distance instead of being in contact therewith, as is the usual procedure, a stereo image of the object photographed will be observed. This is true because the separation of the viewing screen and photographic record allows one eye to see past congruent edges of the screen slits to see one time "frame" or composite picture, while the other eye sees past the other congruent edges of the screen slits to look at another time "frame" or composite picture. Inasmuch as the object was moving, these two observed time "frames," or composite pictures, are separated physically on the plate and this altered angle of convergence is interpreted as stereo. The magnitude of the stereo effect is directly related to the photographic record and viewing screen separation in the viewer, as well as to the object velocity, since these two factors control the relative time spaced "frames" or composite pictures each eye can see. If the viewing screen, photographic record separation is fixed as it would be in any given viewer, then any change in stereo effect which is observed will be that due to the velocity of the object.

In Fig. 1 we have attempted to show by line drawing what would be observed by looking through a viewing screen at a composite picture of a moving object and a still object. In this figure the lined viewing screen V' is diagrammatically illustrated with the transparent lines and opaque separations in reverse relation to what they actually are so as to show the images of the objects; namely, the transparent lines would be the narrow ones and the opaque spaces between lines would be the wide ones. It is also pointed out that the ratio between the width of the transparent and opaque lines is out of scale, because of the limitations enforced by a line drawing rendition of this subject matter. The photographic record bearing the composite pictures of the objects will be behind the viewing screen and is not shown in Fig. 1. In Fig. 5 we have attempted by a top plan view of Fig. 1 to show the relative positions which the photographic record, the viewing screen and the two images observed would have in depth or stereo along the line of sight. In this figure P' designates the photographic record, V' the viewing screen, M', A', R', K' the apparent position of the subject Mark and 8', 3', 2', the apparent position of the moving object 832, the line of sight of the combination being in the direction as designated by the arrows. The still object is the word "Mark" and is introduced in this picture merely to enhance, or make it possible to show, by way of line drawing, that the image of the moving object appears behind the plane of the viewing screen due to a stereo effect. In this instance the moving object was the number 832 carried on a moving belt. Even though the stationary subject "Mark" and the moving subject 832 were substantially in the same plane when photographed, the word "Mark" will appear in the plane of the viewing screen because of lack of motion. There would be no physical separation between the composite pictures or "frames" of this subject for the eye to see and interpret as stereo. On the other hand, since the number 832 was moving, there would be a physical separation of the two composite pictures or "frames" on the photographic record which the two eyes of the observer could pick up and interpret as stereo and the image of the number 832 will appear behind the image of the object "Mark."

The apparent depth of the moving object will vary with the velocity at which it was moving when photographed because the physical separation between the composite pictures or "frames" which the two eyes of the observer will see will vary with the speed of the object. The faster the object, the greater in depth behind the viewing screen it will appear. Accordingly, if two or more moving objects are photographed simultaneously on a photographic plate in the manner set forth, and are viewed through a lined screen spaced from the record, the apparent difference in depth of the two images will indicate which was moving the fastest. It is pointed out that in actual use it is not necessary to photograph a stationary subject such as the word "Mark" shown in the drawing. This reference object was added in this instance only to provide a reference plane to make possible the illustration of stereo for the moving object by the use of a line drawing. While we have shown the moving object as being lighter in density than the word "Mark," this density difference has been used to give the appearance of stereo in a line drawing or to indicate that the moving object 832 will appear behind the word "Mark." In actual practice, the two objects will appear in their normal density relationship, and the moving object will actually appear behind the stationary one due to the stereo effect.

If it is desired to obtain a visual indication of only the velocity characteristics of the moving object, then the lined viewing screen V' can be disposed with its lines parallel to the linear image elements of the photographic record, or in the same relation which the lined screen was during the exposure. Such a relationship of viewing screen and record might be found in Fig. 1.

Suppose, however, the second derivative of motion or acceleration characteristic of the object is desired, this can be obtained by tilting the lined viewing screen V' relative to the photographic record so that each line of the screen will overlap in its length, due to its slope, a plurality of adjacent time "frames" of the record. The maximum slope of the viewing screen relative to the record is the distance between two adjacent equivalent time "frames" which, in the assumed example, would be 29 adjacent time "frames," or .029". Since the observed stereo effect in this case is almost entirely due to motion of the object, the magnitude of the apparent depth of the stereo effect is a direct function of the velocity of the object over the time span the two observed "frames" were taken. Now, when the viewing screen and photographic record are tilted relative to one another, it means that, progressing from the bottom to the top of the screen, one sees successive pairs of time "frames," and the "fixed stereo separation" of each is placed in continuously varying positions which are contiguous over an extended interval of time. In other words, with the screen tilted, as one's vision moves from the bottom to the top of the screen, he is looking at successive pairs of stereo "frames" separated by a constant time interval.

Now, assuming that the object photographed was moving with a non-uniform velocity, for example with positive acceleration, this means that the image separation within each pair of "constant time separation stereo frames," and, therefore, the apparent depth of the image in that pair when observed in the viewer, will vary. In the case of positive acceleration assumed, the image separation in each successive pair of "frames" later in time will increase due to the increased velocity in each successive pair. This corresponds to a weaker angle of convergence of the line of sight and an interpretation as increased depth or stereo. Thus, the stereo image of a positive accelerating object, when viewed through a tilted screen, will appear to tilt backward. Such a condition is shown in Fig. 2 where the moving object was the number 832 and, in this instance, was moving to the right when photographed, as evidenced by movement of its image to the left on the record.

If the object was moving with negative acceleration, this would mean that the "frames" later in time would decrease due to decreased velocity in each successive pair. Thus, the stereo image of such a decelerating object would appear to tilt forward as indicated by the number 832 in Fig. 3. In this instance, the number 832 was moving in a direction opposite to that indicated in Fig. 2, or to the right.

In order to be able to tell whether the observed forward or backward tilt of the moving object indicates positive or negative acceleration, the direction of travel of the object must be known. This information is readily available by merely looking at the record in the viewer, because the image of the moving object will appear to lean sideways in the direction of motion of the object. For example, the sidewise lean of the 832 in Fig. 2 indicates that the object was moving to the left, whereas in Fig. 3 the sidewise lean of the 832 indicates it was moving to the right. This sidewise lean of the moving object is a direct plot of the first derivative (velocity), assuming the taking screen, as well as the object, was moving with a uniform velocity. This apparent sidwise lean of the object, due to velocity, results from the fact that successive time "frames" of the record made visible through the tilted screen are displaced across the record due to the movement of the object. This will all become apparent when one realizes that, when looking at the record through a titled screen, he is seeing small increments of the complete object at successive time intervals, and each of these small increments is physically displayed on the record due to the movement of the object, plus the fact that successive increments represent the positions of the object at successive time intervals. In other words, when one is looking at the bottom of the screen, he sees the increment of the image 832 taken at one time interval. At the same time he is seeing the top increment of the 832 image which was taken sometime later, .029 of a second later in the assumed case, and which is displaced in the direction of movement of the object. At the same time he will see the image increments of the 832 taken at successive time intervals and since each of these increments of the complete image is displaced from the other, the complete image of the object will be observed as leaning in the direction of movement of the object and also will appear to tilt forward or backward due to the stereo effect if the object is accelerating.

The conditions which are necessary to this stereo apparition will be satisfied whether the photographic record is a transparency or a reflection print. However, since the problem of illuminating the composite picture, in order to obtain maximum contrast between the image elements of the picture and the grids of the viewing screen, is more readily solved by backlighting, a photographic record in the form of a transparency is preferable.

Referring now to Figs. 6 and 7, we will describe a preferred form of viewing apparatus which can be used to view the photographic records made in accordance with the present invention to observe the velocity and/or acceleration characteristics of a moving object. This viewer comprises a housing 30 having a window 31 formed in the forward wall thereof. Fixed in covering relation with this window is a lined viewing screen V', like that through which the photographic record to be examined was exposed, said screen being disposed with its transparent lines running vertically under normal circumstances. Near the rear of the housing 30 there is disposed a bank of horizontally arranged fluorescent light tubes 32 which may be backed up by a suitable reflecting surface 33 and which are covered with a sheet of ground glass 34, or other diffusing material, to provide diffuse illumination from the rear of the record. A ventilator 35 is provided in the top of the housing to allow heat from the lamps to escape and, as shown, this ventilator is arranged to direct any light emanating therefrom toward the rear of the viewer and away from the viewing window 31. The light tubes should be mounted in some sort of brackets, such as the one indicated at 36, to facilitate changing burned-out lamps. The electrical components necessary to the fluorescent lighting, i. e., ballast, etc., is contained in a subhousing 37 fastened to the bottom of main housing 30.

The photographic record P' of a moving object, in the form of a transparency, and which was taken through a lined screen in the manner described above, is held against the back of a frame 40 by a pair of guide strips 41 held on opposite vertical sides of the frame by a pair of headed screws 42 and 43. A coiled spring encircling screw 42 normally forces the strips 41 toward the frame and resiliently holds the plate or record P' in a recess therein, see Fig. 6-A. The lower screw 43 allows the strip 41 to float axially thereof by a sufficient amount to accommodate the plate thickness. In front of frame 40 and in encircling relation with window 31 is a second frame 44 having rearwardly extending bearings 45 on its lower edge which rotatably and slideably engage axles 46 and 47 extending into the housing from opposite side walls. The lower edge of the frame 44 also has two spaced threaded bosses 48 which engage a screw 49 which is coaxial with the pivot point of frame 44. The left-hand end of this screw is threaded into a tapped bore in axle 47, while the other end thereof is connected by a pin-and-slot connection 50 to a knob 51 extending to the outside of the housing, and by means of which the screw can be turned. This adjustment is provided for shifting the plate or record laterally of the viewing screen V' to both align the lines of the screen with the linear images of the record, and to change the composite picture viewed if the viewer is used to successively view the several pictures on the record in the normal manner.

The top cross arm of frame 40 is connected to the top cross arm of frame 44 by headed studs 52 in the latter engaging arcuate slots 53 in the former. This stud and slot connection permits frame 40 to tilt relative to frame 44 and the viewing screen V' about pivot point 54 at the bottom of the frame. A coiled spring 55 normally pivots frame 40 clockwise about pivot point 54 to a vertical position in which it is positively located by a stop 56 engaged by the lower cross arm of frame 40. In order to be able to selectively tilt the plate or record relative to the viewing screen, an adjusting screw 57, threaded through a block 58 fixed to the vertical arm of frame 44, is turned clockwise, whereupon its end pushes against the vertical edge of frame 40 near its top. To permit loading a plate into the frame 40, the top of the housing is provided with a hinged cover 60 which may be raised by means of knob 61. The two frames can be pivoted rearwardly by pressing on the adjusting screw 57, the side wall of the housing having an arcuate slot 63 through which the screw extends for this purpose. The two frames 40 and 44 are normally moved forwardly to a viewing position by a pair of leaf springs 64 acting on the vertical arms of frame 44. An adjustable stop screw 65, extending through the front of the housing above the window, engages the cross arm of frame 44 and locates the plate or record P' in proper spaced relation with the lined viewing screen V' to give the desired stereoscopic view of the images on the record.

In order to determine just what the value of acceleration and/or velocity of the object is, as indicated by the apparent depth of its stereo image, some means must be provided to give a measure of this apparent depth of the image as viewed and which measure can be converted into values of acceleration and/or velocity. To this end we provide the top of the housing with an adjustable pointer 70 which extends down into the field of view of the window and can be slid forwardly and rearwardly of the housing by means of a knob 71. Looking through the window, this pointer will appear behind the plane of the viewing screen in silhouette, much as indicated in Fig. 4, and one can readily adjust the position of this pointer until it matches the apparent stereo position of the object being viewed. If this pointer is provided with an index 72 which cooperates with a scale 73, then the position of the pointer at any point of adjustment can be determined. By taking pictures of objects having known acceleration and velocity characteristics, the scale 73 can be calibrated directly in values which will be measures of the characteristics desired. It will be appreciated that in determining the acceleration characteristics of a moving object which appears tilted forwardly or rearwardly in the viewer, the value which is of interest is the amount of tilt of the image. This involves determining the apparent position in depth of both the top and bottom of the image with the pointer 70 and then subtracting the scale readings. From this difference in readings, the acceleration of the object can be looked up from a calibrated chart. This reading could be facilitated by pivoting the frame 40 so that the plate or record P' could be tilted about its spatial center, rather than about its lower edge. Then, since the apparent position of the center of the object would not change as the plate is tilted, the top and bottom of the image of the object would shift by equal amounts forwardly and rearwardly of this center point, or the axis passing therethrough at right angles to the lines of the screen. In order to determine the amount of tilt of the image all that would be necessary would be to allow the screen to assume its vertical position, as shown in Fig. 4, match the image of the pointer 70 with the image of the object in space, take the reading from scale 73, which would be the velocity reading directly, tilt the picture a given amount by screw 57, again match the pointer with the top of the now-tilted image, and multiply the difference between the scale reading now obtained with the initial reading by 2, and the amount of tilt of the image would be directly obtained.

Although we have shown and described certain specific embodiments of our invention, we are aware that many modifications thereof are possible. Our invention, therefore, is not to be restricted to the specific details shown and described by way of illustration, but is intended to cover all modifications coming within the scope of the appended claims.

Having thus described our invention, what we claim is new and desire to secure by Letters Patent of the United States is:

1. The method of obtaining a visual indication in stereo of the velocity characteristics of a moving object comprising the steps of making a photographic record of the moving object by photographing it on a sensitized surface through a lined screen moved across and substantially at the focal plane with a uniform velocity and in a direction substantially parallel to that of the movement of the object, the transparent lines of said screen separated by a distance equal to a multiple of the width of said lines; placing in front of said photographic record a lined viewing screen identical with the one through which the exposures were made orienting said viewing screen with respect to the record the same as the exposing screen was during the exposure of said record; and spacing said viewing screen from the photographic record in parallel relation thereto by an amount such that when the record is binocularly viewed through said screen opposite eyes of the observer will simultaneously see through each line of the viewing screen different "time frames" of the record which are physically separated, whereby an image of the object will appear in stereo, the stereo effect varying directly with the velocity of the object.

2. The method of obtaining a visual indication in stereo of the velocity and acceleration characteristics of a moving object comprising the steps of making a photographic record of the moving object by photographing it on a sensitized surface through a lined screen moved across and substantially at the focal plane with a uniform velocity and in a direction substantially parallel to that of the movement of the object, the transparent lines of said screen separated by a distance equal to a multiple of the width of said lines; placing in front of said photographic record a lined viewing screen identical to that through which the exposures were made; inclining said viewing screen relative to said record so that in its slope a line thereof subtends a distance on the record less than that between two adjacent images equivalent in time; and spacing said viewing screen from the record in parallel relation thereto by such an amount that opposite eyes of the observer will simultaneously see through each line of the viewing screen different "time frames" of the record which are physically separated by distances corresponding to both the velocity and acceleration characteristics of the object, whereby an image of the object will appear in stereo and will appear to lean sideways in the direction of its movement and different portions thereof will show different stereo effects depending upon the acceleration characteristics of the object's motion.

3. The method of determining the acceleration characteristics of a moving object comprising the steps of making a photographic record of the moving object by photographing it on a sensitized surface through a lined screen moved across and substantially at the focal plane with a uniform velocity and in a direction substantially parallel to that of the movement of the object, the transparent lines of said screen being separated by distances equal to a multiple of the width of said lines whereby the photographic record comprises a series of composite pictures each made up of a plurality of line images separated by the same time interval and each composite picture representing an instantaneous position of the object; placing in front of said photographic record a lined screen identical to that through which it was exposed, but with the lines thereof inclined to the image elements of said record so that in their length each line overlaps a plurality of adjacent line images but not two adjacent images equivalent in time; and spacing said viewing screen in parallel relation to said record by an amount such that opposite eyes of the observer will simultaneously see through each line of the viewing screen different "time frame" of the record which are physically separated in accordance with the velocity and acceleration characteristics of the object whereby these characteristics become apparent as different stereo effects.

4. The method of determining the acceleration characteristics of a moving object comprising the steps of making a photographic record of the moving object by photographing it on a sensitized surface through a lined screen which is moved across and substantially at the focal plane with uniform velocity in a direction substantially parallel to that of the object and substantially at right angles to the lines thereof, said lined screen composed of parallel transparent lines of like width separated by opaque areas whose width is a multiple of the transparent line width whereby the photographic record will comprise a plurality of contiguous line images of different parts of the moving object, each line image differing from adjacent line images in an equal time sense and those spaced from each other by the multiple of the line width to the line spacing of the screen being equivalent time images which when viewed simultaneously produce a composite image of the object at one instant during its movement; placing in front of said photographic record a lined screen identical to that through which it was exposed but with the lines thereof inclined relative to the line images of the record such that each line of the viewing screen, in its length, overlaps a plurality of contiguous line images included between two adjacent equivalent time images; and spacing said viewing screen in parallel relation to said record by an amount such that opposite eyes of the observer will simultaneously see through each line of the screen different line images or "time frames" of the record which are physically separated in accordance with the acceleration characteristics of the object whereby these characteristics become apparent as different stereo effects.

5. Viewing apparatus of the type described comprising a substantially closed housing provided with a window in its front wall, a light source in said housing for uniformly illuminating said window, means for locating a lined viewing screen and a transparent photographic record of a moving object exposed through an identical lined screen in superposed relation behind said window and in front of said light source, means for tilting said lined screen and record relative to one another so that each line of said screen, in its length, overlaps a plurality of adjacent line images of the record disposed between two adjacent equivalent time images of the record, means for spacing said lined screen and photographic record in parallel relation by an amount such that one observing said lined screen binocularly will simultaneously see through each line of the screen with opposite eyes, different "time frames" of the record which are physically separated in accordance with the velocity and acceleration characteristics of the object whereby these characteristics become apparent as different stereo effects.

6. Viewing apparatus of the type described comprising a substantially closed housing provided with a window in its front wall, a light source in said housing for uniformly illuminating said window, means for locating a lined viewing screen and a transparent photographic record of a moving object exposed through a like lined screen in superposed relation behind said window and in front of said light source, means for tilting said lined screen and record relative to one another so that each line of said screen, in its length, overlaps a plurality of adjacent line images of the record disposed between two adjacent equivalent time images of the record, means for spacing said lined screen and photographic record in parallel relation by an amount such that one observing said lined screen binocularly will simultaneously see through each line of the screen with opposite eyes, different "time frames" of the record which are physically separated in accordance with the velocity and acceleration characteristics of the object whereby these characteristics become apparent as different stereo effects, and a pointer extending into said housing behind said lined screen and record combination and in front of said illuminating means to be viewed through said window, means for adjusting said pointer along the line of sight to match the position of the same with the apparent stereo position of the object viewed through said window, and a fixed scale calibrated in values of acceleration and/or velocity with which said pointer cooperates.

7. A viewing apparatus according to claim 5, in which said viewing screen is fixed relative to said window, a frame for removably holding said photographic record in position, said frame pivotally mounted to move between a normal operative position, wherein the record supported thereby is held in parallel spaced relation with said screen, and a loading position, wherein it is pivoted rearwardly to facilitate loading a record thereinto through an aperature in the top of said housing, means for shifting said frame sideways relative to said window to align the lines of said screen with the linear images of said record, and means for tilting said frame laterally relative to said screen.

FORDYCE E. TUTTLE.
WALTER C. NEWCOMB.

References Cited in the file of this patent

UNITED STATES PATENTS

| Number | Name | Date |
| --- | --- | --- |
| 954,555 | Willoughby et al. | Apr. 12, 1910 |
| 1,006,769 | Merrill | Oct. 24, 1911 |
| 1,150,374 | Kanolt | Aug. 17, 1915 |
| 1,230,102 | Bottum | June 19, 1917 |
| 1,260,682 | Kanolt | Mar. 26, 1918 |
| 1,501,842 | Duda | July 15, 1924 |
| 1,946,934 | Dorst | Feb. 13, 1934 |
| 1,950,374 | Kanolt | Mar. 6, 1934 |
| 1,984,004 | Wildhaber | Dec. 11, 1934 |
| 2,250,442 | Abell | July 29, 1941 |
| 2,259,223 | Rankin | Oct. 14, 1941 |

FOREIGN PATENTS

| Number | Country | Date |
| --- | --- | --- |
| 421,120 | Great Britain | Dec. 10, 1934 |